April 16, 1940.  A. F. P. STENZY  2,197,014
SPEED INCREASING GEARING
Filed April 16, 1938  6 Sheets-Sheet 1
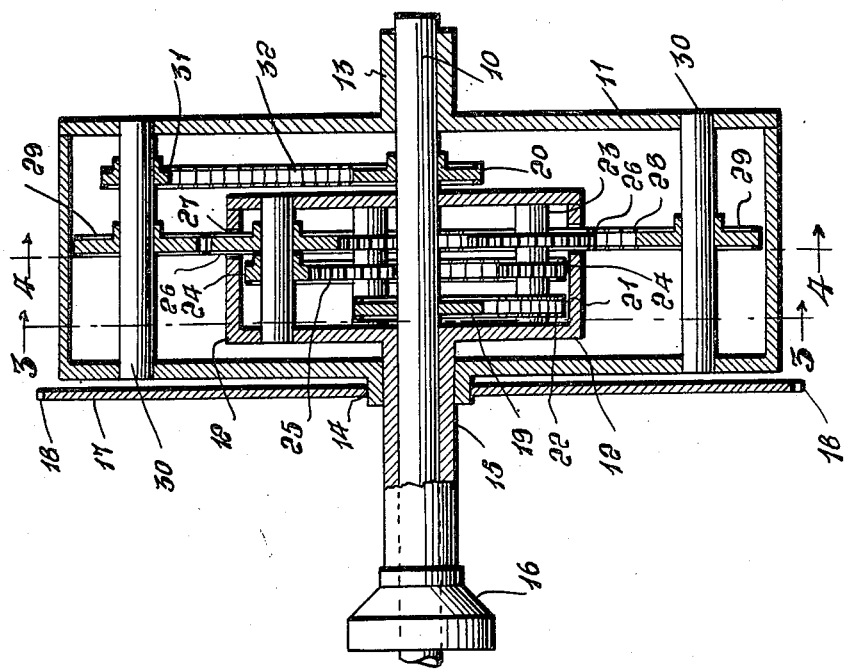
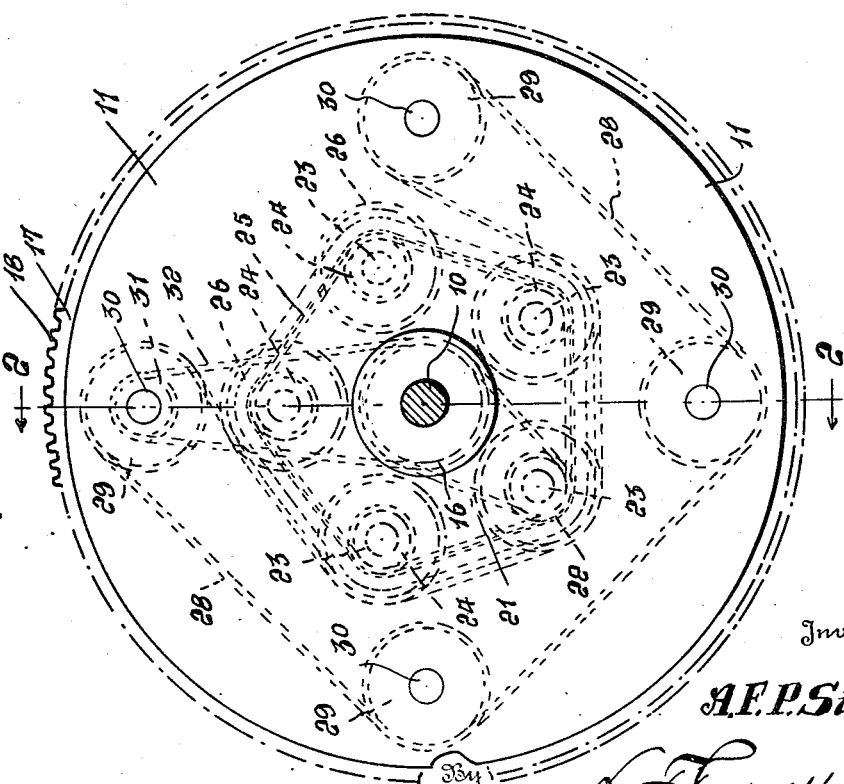

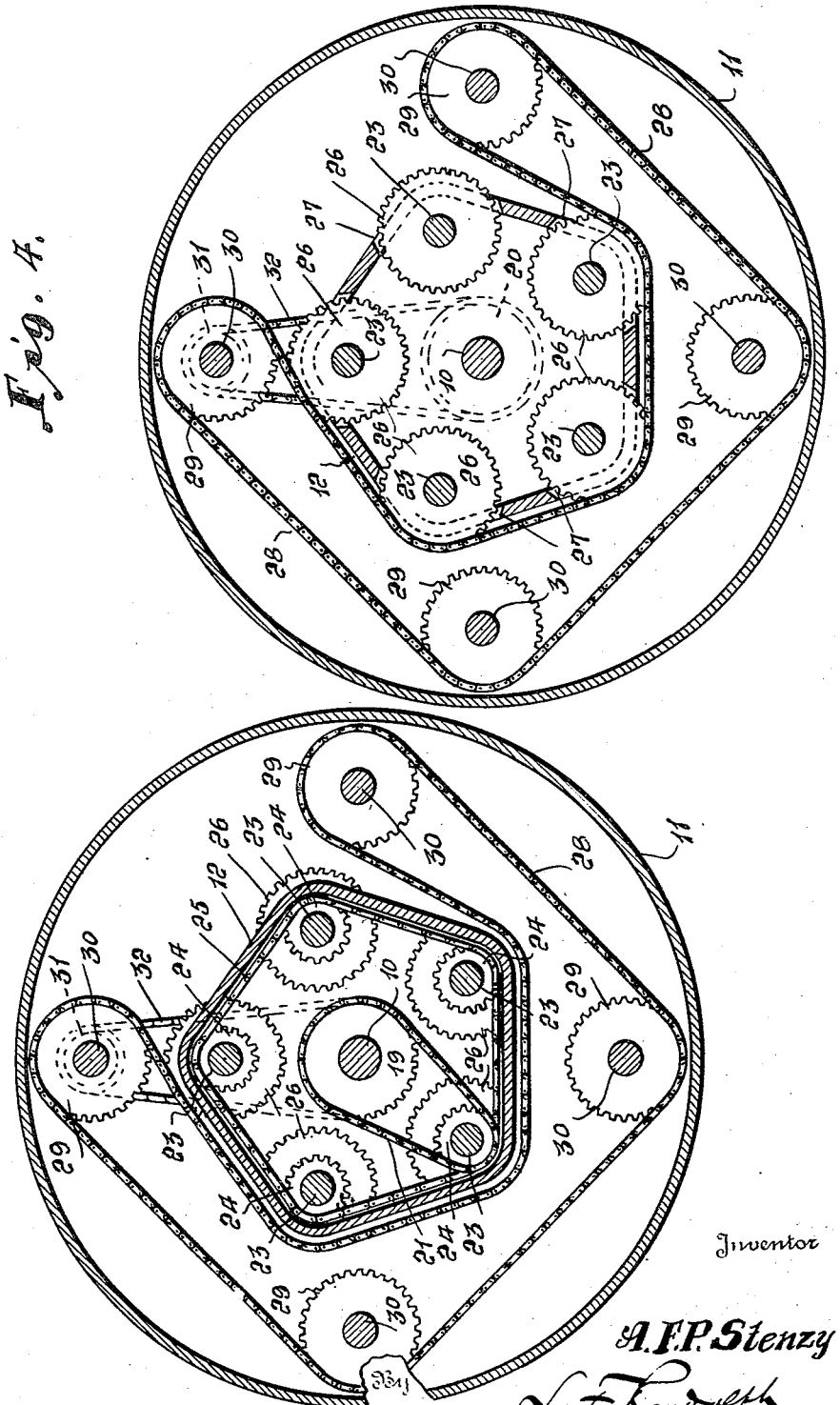

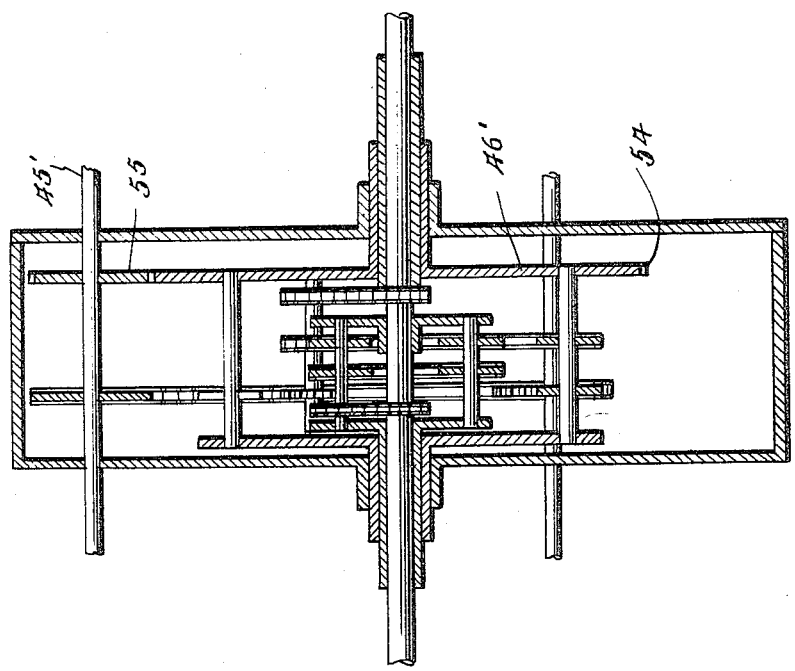
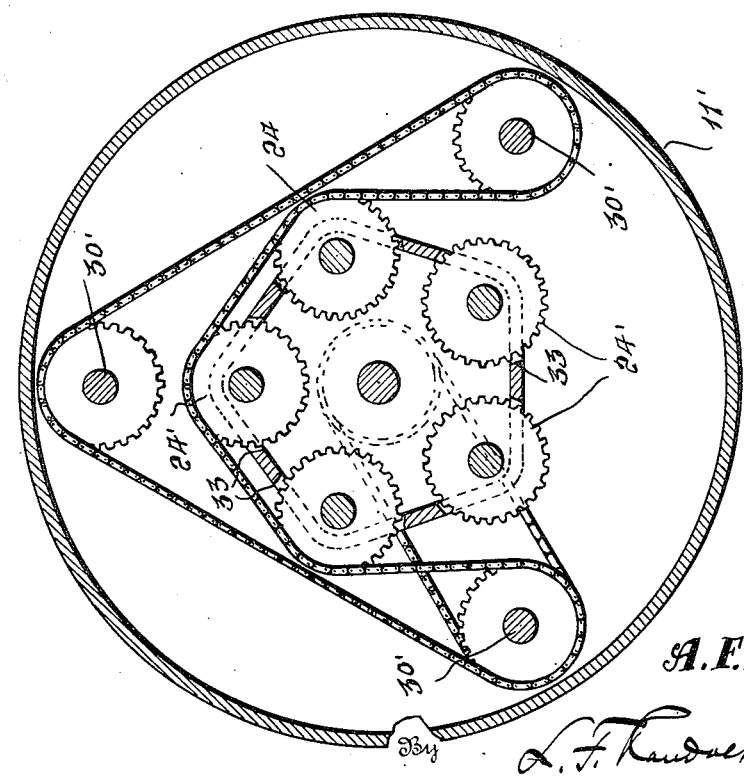

April 16, 1940.  A. F. P. STENZY  2,197,014
SPEED INCREASING GEARING
Filed April 16, 1938  6 Sheets-Sheet 5
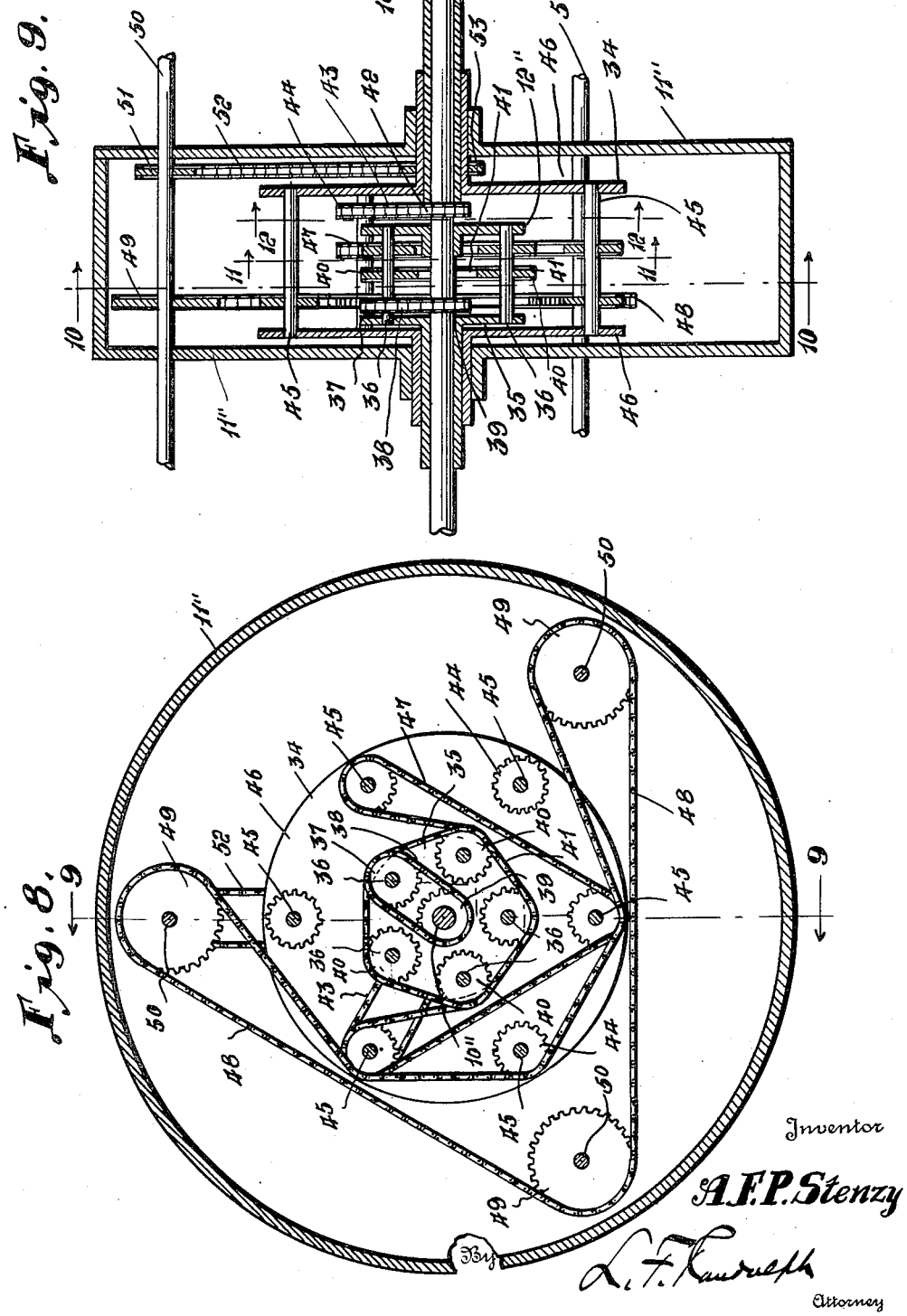

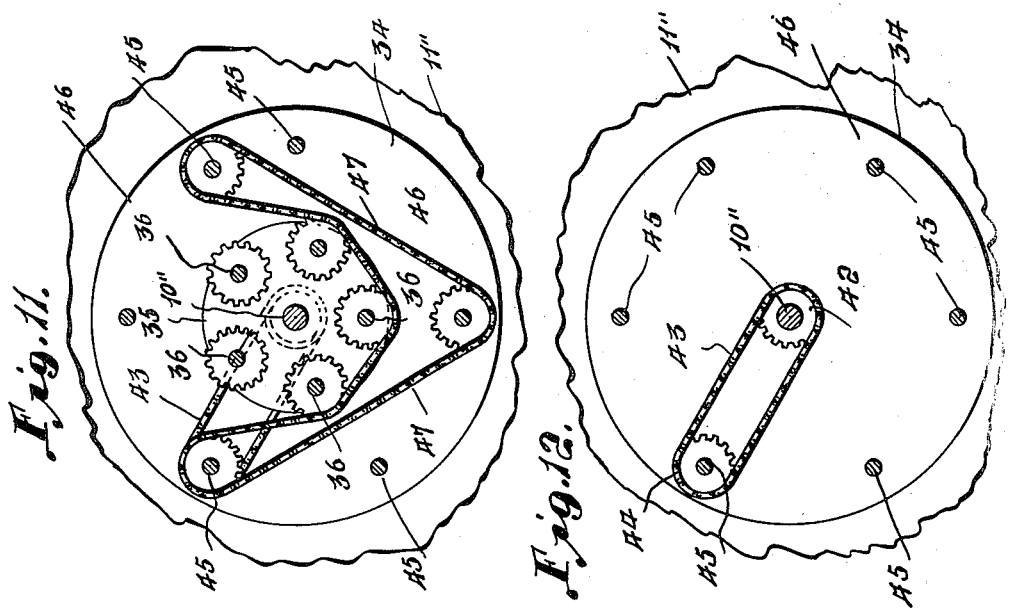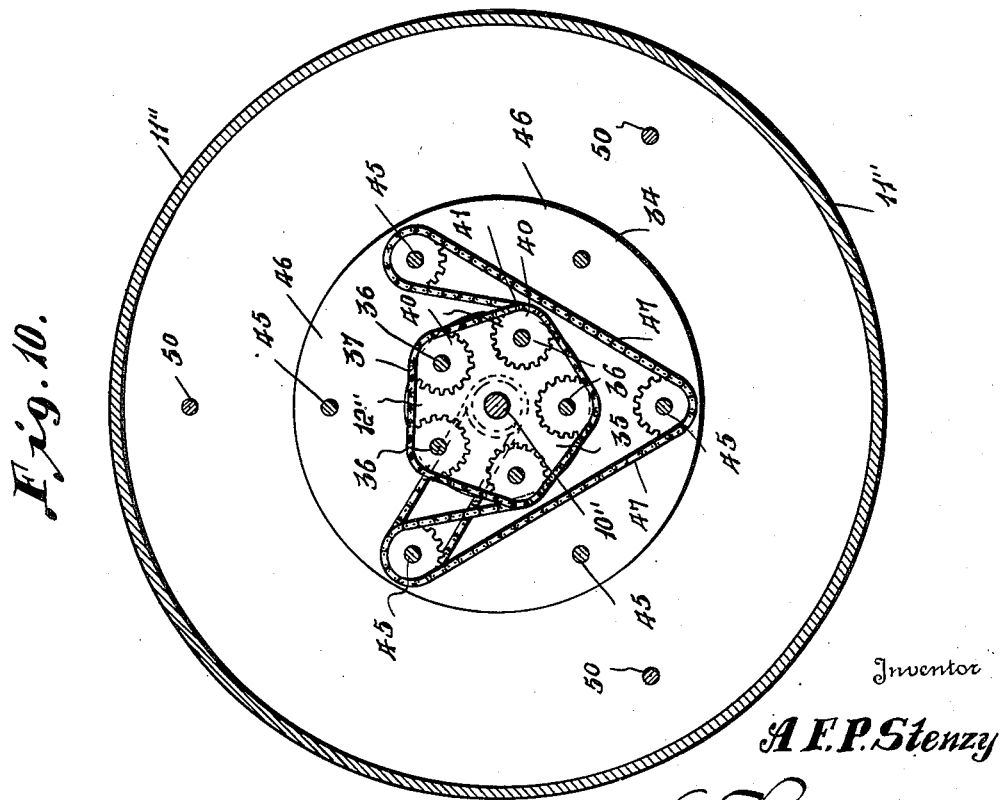

Patented Apr. 16, 1940

2,197,014

UNITED STATES PATENT OFFICE 2,197,014

SPEED INCREASING GEARING

August F. P. Stenzy, Baltimore, Md., assignor of forty-nine one-hundredths to Stephen Ratajczak, Baltimore, Md.

Application August 16, 1938, Serial No. 225,237

11 Claims. (Cl. 74—259)

The invention relates to gearing with a view to providing maximum torque or speed in a driven shaft or part relative to the driving shaft or part.

The various important objects and advantages will become apparent from the description following taken in connection with the accompanying drawings illustrating operative embodiments.

In said drawings:

Figure 1 is a view in vertical section, transverse to the axis of rotation, through one form of the invention;

Figure 2 is a sectional view taken on the plane of line 2—2 of Figure 1;

Figure 3 is a sectional view taken on the plane of line 3—3 of Figure 2;

Figure 4 is a sectional view taken on the plane of line 4—4 of Figure 2;

Figure 7 is a sectional view taken on the plane of line 7—7 of Figure 6;

Figure 8 is a vertical sectional view through a further modified form, being taken on a plane at a right angle to the axis of rotation;

Figure 9 is a vertical sectional view taken on the plane of line 9—9 of Figure 8;

Figure 10 is a vertical section taken on the plane of line 10—10 of Figure 9;

Figure 11 is a vertical section taken on the plane of line 11—11 of Figure 9;

Figure 12 is a vertical section taken on the plane of line 12—12 of Figure 9; and Figure 13 is a vertical sectional view similarly to Figure 12, through a slightly modified form thereof.

Figure 6:
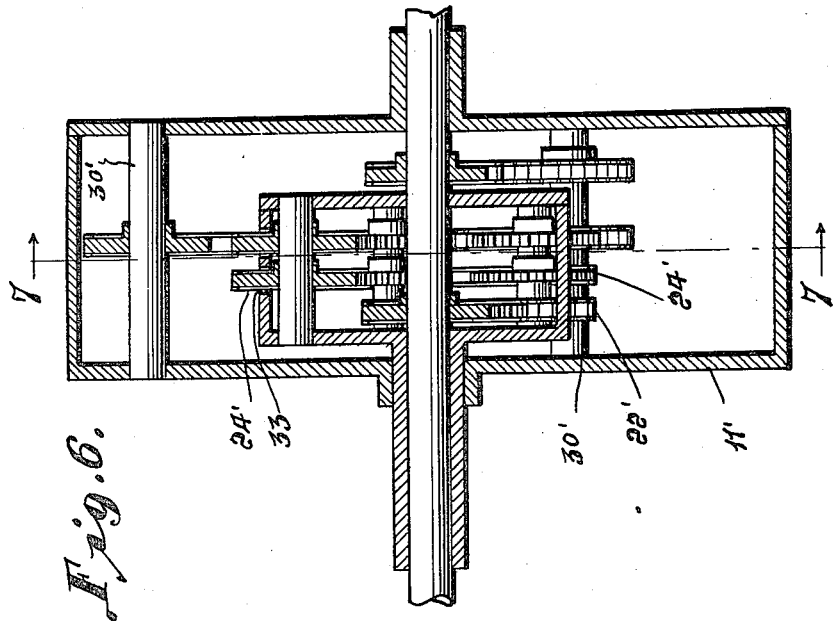
Figure 6 is a vertical sectional view taken on the plane of line 6—6 of Figure 5.

Referring specifically to the drawings and first to the form disclosed in Figures 1 to 4, 10 designates a rotatable drive shaft, adapted to be driven in either direction, from any suitable source of power and under any appropriate clutch or other control. Rotatable about the axis of said drive shaft 10 is a frame 11 and also rotatable about the same axis, or maintained stationary relatively thereto, as operative conditions demand, is a frame 12. Casing 11 has sleeves 13 and 14, the former preferably constituting a power take-off and also serving as bearing for directly journaling the shaft 10. Sleeve 14 is journaled on a sleeve 15 extending from the frame 12 and in which the drive shaft 10 is also journaled. Associated with the sleeve 15 is a conventional brake or any equivalent means 16, which may be operated to hold the frame 12 stationary with respect to the other parts, or to release it for rotation as desired. Keyed or otherwise rigidly fastened to the sleeve 14 is a gear or drive member 17 which is useful in starting or cranking the device, especially when used in connection with an oil or gasoline motor, which is geared to the peripheral teeth 18 of such starting wheel or crank 17.

Keyed to the drive shaft 10 are sprocket wheels 19 and 20, the former preferably being located within the casing 12 and the latter outside of such casing. A sprocket chain 21 is trained over the sprocket wheel 19 and over a sprocket wheel 22 rigid with one of a series of shafts 23, parallel to the drive shaft 10 and journaled in the side walls of the frame 12. Such shafts 23 may be employed in any desired number and they are equidistantly arranged about the shaft 10 in a path concentric therewith. Each of the rotary shafts 23 has a sprocket wheel 24 keyed thereto over which a sprocket chain 25 is trained. In addition, larger sprocket wheel 26 are keyed to each rotary shaft 23 and they project beyond the periphery thereof through openings 27 in such frame 12.

Said sprocket wheels 26 have an endless sprocket chain 28 trained thereover and which is also trained over sprocket wheels 29 on shaft 30, journaled in the side walls of frame 11. Such shafts 30 may be of any desired number but are disposed equidistantly about the axis of shaft 10 in a path concentric with such axis.

The drive shaft 10 also drives the shafts 30 since a sprocket wheel 31 is keyed to one of them and a sprocket chain 32 is trained thereover as well as over the sprocket wheel 20.

It will be understood that the illustration is by way of example only since the frames may be of any desired size and arrangement. It will also be realized that bearings are provided at various locations to facilitate rotation of the different shafts and parts with minimum friction, and so as to permit the slight adjustments usually advisable for machine parts. In addition, the gearing shown consisting of sprocket wheels and sprocket chains is also shown by way of example only since belts and pulleys or any other type of gearing or driving means may be substituted.

The driving of shaft 10, through the various sprocket wheels and chains or the equivalent, and the frames 12 and 11, will control the speed and torque imparted by the shaft 10 to the frame 11 so that the power may be taken off of the same as at 13. In addition, it is to be realized that the frame 11 may also function directly as a pulley, flywheel, car wheel, gear wheel, propeller or any other form of driving member.

The frames or casings 11 and 12 are preferably cast of metal, cut and formed and assembled by means of bolts or the equivalent and they are oil-tight and dustproof and the gearing runs practically silently.

Figure 5:
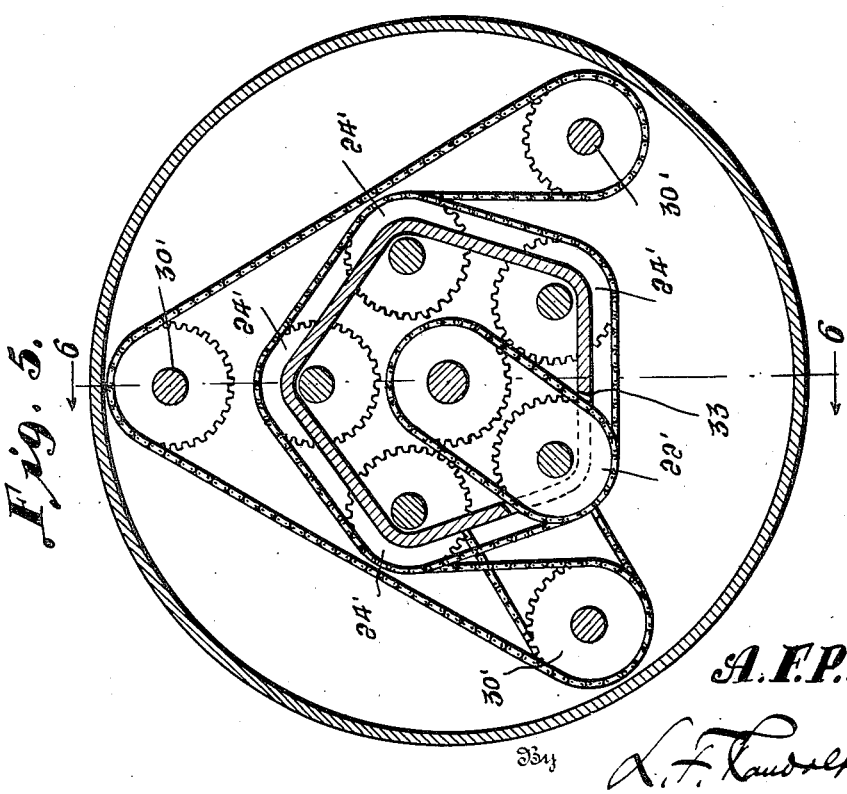
Figure 5 is a vertical sectional view through a modified form taken on plane crossing the axis of rotation.

A first modified form is suggested in Figures 5, 6 and 7, corresponding for the most part to parts of Figures 1 and 4 and primed reference numerals have been used therefor, such primed parts conforming in construction and operation to the parts of the first form omitting the priming. It will be noted in this modified form that instead of sprocket wheels, mere pulleys are used and that instead of sprocket chains, belts are trained over the pulleys. The wheels 22' and 24' in this form of the invention are preferably larger than those at 22 and 24, respectively, and they extend outwardly through openings 33 in the frame 11. This form of the invention may utilize the starting member 17 and the clutch 16, if desired, or any appropriate substitute. It will be particularly noted, that there are fewer of the shafts 30' than there are shafts 30, specifically being three as compared to four.

Attention is called to the fact that the number of the frames employed is not limited to two as illustrated in the figures described since three or more frames may be utilized, according to the increase desired. For instance, one form utilizing three frames is illustrated in Figures 8 to 12. In this form, the frames are shown at 11", 12" and 34, all being capable of rotation relatively to each other and with each other as described with respect to the preceding form and with respect to the drive shaft here designated 10". Said frame 12" is driven like the frame 12 from its drive shaft 10 either by sprocket wheels and sprocket chains as disclosed in the first form of the invention or any equivalent, as preferred, the former being shown for example. Such frame 12" has a number of spaced disks or plates 35, suitably connected together, all of the frames having sleeves as shown, concentric with the shaft 10" and being concentric with the latter, and journaled thereon and on each other, means being provided if desired, to hold any and all of the frames against rotation and for instance by brake means such as is suggested at 16 in the first form. Said plates 35 of the frame 12" mount countershafts 36 for rotation, the same being employed in any desired number and equidistantly spaced in a path concentric with the center of the shaft 10". On one shaft 36, a pulley 37 is keyed, being traversed by a chain 38 driven from a pulley 39 keyed to the drive shaft 10". On all of the shafts 36, pulleys 40 are keyed and an endless chain 41 traverses the same.

Also keyed to shaft 10" is a pulley 42 traversed by a chain 43 also trained over a pulley 44 keyed to one of the transverse shafts 45 of the frame 34. Said shafts 45 are employed in any desired number and are journaled in the plates 46 constituting the main walls of frame 34. Said shafts 45 are used in any preferred number, being equidistantly spaced in a path concentric with the axis of shaft 10" and trained over a number of them is an endless chain 47.

Another endless chain 48 contacts certain of the pulleys 44 and is trained over pulleys 49 keyed to shafts 50, journaled in the side walls of frame 11", being employed in any desired number and arranged equidistantly in a path concentric with the axis of shaft 10". On one shaft 50 a pulley 51 is keyed and a chain 52 is trained thereover and also over a pulley 53 rigid with the sleeve of frame 34, or any other desired part, so that such frame will drive the frame 11" so that the power may be taken from the latter in the same manner as explained with respect to the frame 11, the power and torque, being increased over such form by the multiplication of the frames and associated gearing.

Figure 13 corresponds for the most part to Figure 9. It differs there from only in the fact that one wall 46' the equivalent of one of the walls 46, is formed into a gear wheel, having peripheral teeth as at 54, enmeshed with a gear wheel 55 keyed to a shaft 45', and equivalent to one of the shafts 45 of the preceding form. Thus the gears 46' and 55 are substituted for the pulley and belt gearing at 51, 52 and 53. The operation and results attained corresponding to those attained by the form of Figures 8 to 12.

I claim as my invention:

1. Apparatus of the class described having a drive shaft, first and second frames relatively rotatable on the drive shaft, the second frame being located within the first frame to enable the latter to function as a driver, shafts journaled on the second frame, gearing connecting the frame shafts, means to drive one of the frame shafts from the drive shaft, shafts journaled on the first frame, gearing connecting the latter shafts and the second frame shafts, and means to drive one of the first frame shafts from the drive shaft.

2. Apparatus of the class described having a drive shaft, first and second frames relatively rotatable on the drive shaft, the second frame being located within the first frame to enable the latter to function as a driver, shafts journaled on the second frame, gearing connecting the frame shaft, means to drive one of the frame shafts from the drive shaft, shafts journaled on the first frame, gearing connecting the latter shafts and the second frame shafts, means to drive one of the first frame shafts from the drive shaft, means operable to hold the second mentioned frame stationary while the first frame and drive shaft rotate.

3. Apparatus of the class described having a drive shaft, first and second frames relatively rotatable on the drive shaft, the second frame being located within the first frame to enable the latter to function as a driver, shafts journaled on the second frame, gearing connecting the frame shaft, means to drive one of the frame shafts from the drive shaft, shafts journaled on the first frame, gearing connecting the latter shafts and the second frame shafts, means to drive one of the first frame shafts from the drive shaft, and a starter plate secured to one side of the first mentioned frame.

4. Apparatus of the class described having a drive shaft, first and second frames relatively rotatable on the drive shaft, the second frame being located within the first frame to enable the latter to function as a driver, shafts journaled on the second frame, gearing including an endless flexible member connecting the frame shafts, means to drive one of the frame shafts from the drive shaft, shafts journaled on the first frame, gearing including an endless flexible member connecting the latter shafts and the second frame shafts, and means to drive one of the first frame shafts from the drive shaft.

5. Apparatus of the class described having a drive shaft, first and second frames relatively rotatable on the drive shaft, the second frame being located within the first frame to enable the latter to function as a driver, shafts journaled on the second frame, gearing including an endless flexible member connecting the frame shafts, means to drive one of the frame shafts from the drive shaft, shafts journaled on the first frame, gearing including an endless flexible member connecting the latter shafts and the second frame shafts, means to drive one of the first frame shafts from the drive shaft, said endless flexible members being belts.

6. Apparatus of the class described having a drive shaft, first and second frames relatively rotatable on the drive shaft, the second frame being located within the first frame to enable the latter to function as a driver, shafts journaled on the second frame, gearing including an endless flexible member connecting the frame shafts, means to drive one of the frame shafts from the drive shaft, shafts journaled on the first frame, gearing including an endless flexible member connecting the latter shafts and the second frame shafts, means to drive one of the first frame shafts from the drive shaft, said flexible endless members being sprocket chains.

7. Apparatus of the class described having a drive shaft, first and second frames relatively rotatable on the drive shaft, the second frame being located within the first frame to enable the latter to function as a driver, shafts journaled on the second frame, gearing including an endless flexible member connecting the frame shafts, means to drive one of the frame shafts from the drive shaft, shafts journaled on the first frame, gearing including an endless flexible member connecting the latter shafts and the second frame shafts, means to drive one of the first frame shafts from the drive shaft, both means to drive frame shafts from the drive shaft having endless drive members.

8. Apparatus of the class described having a drive shaft, first and second frames relatively rotatable on the drive shaft, the second frame being located within the first frame to enable the latter to function as a driver, shafts journaled on the second frame, gearing connecting the frame shafts, means to drive one of the frame shafts from the drive shaft, shafts journaled on the first frame, gearing connecting the latter shafts and the second frame shafts, means to drive one of the first frame shafts from the drive shaft, a sleeve on the second frame extending exteriorly of the first frame, and brake means associated with said sleeve operable to hold the second frame stationary while the first frame and drive shaft rotate.

9. Apparatus of the class described having a drive shaft, a first frame, a plurality of frames within the first frame, said frames being relatively rotatable on the drive shaft, means to drive the first frame and one of the remaining frames from the drive shaft, and driving gearing interconnecting all of the frames.

10. Apparatus of the class described having a drive shaft, a first frame, a plurality of frames within the first frame, said frames being relatively rotatable on the drive shaft, means to drive the first frame and one of the remaining frames from the drive shaft, driving gearing interconnecting all of the frames, and means operable to maintain either of the plurality of frames stationary relatively to the remaining frames and shaft.

11. Apparatus of the class described having a drive shaft, a first frame, a plurality of frames within the first frame, all of the frames being relatively rotatable on the drive shaft, auxiliary shafts on all of the frames in paths concentric with the axis of the drive shaft and the shafts of each frame being equidistantly spaced in said paths, gearing connecting the shafts of each frame, and shafts of the different frames, and gearing to drive the first frame and one of the plurality of frames from the drive shaft.

AUGUST F. P. STENZY.